(12) United States Patent
Vigild et al.

(10) Patent No.: US 10,202,945 B2
(45) Date of Patent: Feb. 12, 2019

(54) METHOD AND DEVICE FOR CONTROLLING A MOTOR-VEHICLE INTERNAL COMBUSTION ENGINE FITTED WITH A FUEL INJECTION SYSTEM AND AN EXHAUST GAS RECIRCULATION SYSTEM

(71) Applicant: Ford Global Technologies, LLC, Dearborn, MI (US)

(72) Inventors: Christian Winge Vigild, Aldenhoven (DE); Frederik De Smet, Genk (BE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 15/243,494

(22) Filed: Aug. 22, 2016

(65) Prior Publication Data
US 2017/0058801 A1    Mar. 2, 2017

(30) Foreign Application Priority Data

Aug. 24, 2015    (DE) .................. 10 2015 216 138
Aug. 24, 2015    (DE) .................. 10 2015 216 139

(51) Int. Cl.
*B60T 7/12*         (2006.01)
*F02M 26/71*      (2016.01)
(Continued)

(52) U.S. Cl.
CPC ......... *F02M 26/71* (2016.02); *F02D 41/0055* (2013.01); *F02D 41/12* (2013.01);
(Continued)

(58) Field of Classification Search
CPC ........ F02M 26/00; F02M 26/71; F02D 41/12; F02D 41/144
(Continued)

(56) References Cited

U.S. PATENT DOCUMENTS 4,103,649 A * 8/1978 Matumoto .......... F02D 41/1487
   123/676
4,289,108 A * 9/1981 Shioyama ............. F02D 41/005
   123/480

(Continued)

FOREIGN PATENT DOCUMENTS

DE    102007000211 A1    10/2007
DE    102010036485 B3    12/2011
(Continued)

*Primary Examiner* — John Kwon
(74) *Attorney, Agent, or Firm* — Julia Voutyras; McCoy Russell LLP (57) ABSTRACT

Embodiments are provided herein for controlling a motor-vehicle internal combustion engine fitted with a fuel injection system and an exhaust gas recirculation system. In one example, in a deceleration phase a closed exhaust gas recirculation circuit is formed, a mass ($m_{circ}$) of an air quantity enclosed therein is determined, a first oxygen content ($O_{2,exh1}$, $O_{2,man1}$) of the air quantity is detected, a test injection is carried out with an injection valve, a second oxygen content ($O_{2,exh2}$, $O_{2,man2}$) of the air quantity is detected, and the fuel mass ($m_{fuel}$) injected in the test injection is determined from the mass ($m_{circ}$) of the air quantity and the first and the second oxygen content ($O_{2,exh1}$, $O_{2,man1}$, $O_{2,exh2}$, $O_{2,man2}$). The disclosure also relates to a corresponding device for controlling a motor-vehicle internal combustion engine fitted with a fuel injection system and an exhaust gas recirculation system.

20 Claims, 5 Drawing Sheets

(51) Int. Cl.
  *F02D 41/00* (2006.01)
  *F02M 26/47* (2016.01)
  *F02D 41/12* (2006.01)
  *F02D 41/14* (2006.01)
  *F02D 41/24* (2006.01)
  *F02M 26/00* (2016.01)

(52) U.S. Cl.
  CPC ....... *F02D 41/144* (2013.01); *F02D 41/2467* (2013.01); *F02M 26/00* (2016.02); *F02M 26/47* (2016.02); *F02D 41/008* (2013.01); *F02D 41/123* (2013.01); *F02D 2200/0616* (2013.01); *Y02T 10/47* (2013.01)

(58) Field of Classification Search
  USPC .................. 701/103, 108, 109, 114, 115
  See application file for complete search history.

(56) References Cited

U.S. PATENT DOCUMENTS

| | | | | |
|---|---|---|---|---|
| 4,445,489 A * | 5/1984 | Kobayashi | .......... | F02D 41/0052 123/486 |
| 4,790,286 A * | 12/1988 | Nishida | ............... | F02D 41/0052 123/568.27 |
| 5,113,651 A * | 5/1992 | Kotzan | ..................... | F01N 3/22 60/274 |
| 5,657,736 A * | 8/1997 | Maki | .................. | F02D 41/0085 123/673 |
| 6,148,808 A * | 11/2000 | Kainz | ................. | F02D 41/0085 123/673 |
| 7,356,985 B2 * | 4/2008 | Hirata | .................. | F02D 41/008 123/673 |
| 7,715,975 B2 * | 5/2010 | Yamaoka | ............ | F02D 41/0002 123/435 |
| 8,616,186 B2 * | 12/2013 | Surnilla | ................. | F02M 26/08 123/568.11 |
| 8,739,760 B2 * | 6/2014 | Hokuto | ............... | F02D 41/0057 123/299 |
| 9,074,541 B2 * | 7/2015 | Surnilla | ................ | F02D 41/005 |
| 9,243,575 B2 * | 1/2016 | Ando | .................... | F02D 41/024 |
| 9,518,529 B2 * | 12/2016 | Surnilla | .................. | F02D 43/00 |
| 2006/0011180 A1 * | 1/2006 | Sasaki | .................. | F01N 3/0814 123/698 |
| 2007/0169464 A1 * | 7/2007 | Saito | ................... | F02D 41/1438 60/276 |
| 2008/0275627 A1 * | 11/2008 | Matsunaga | ........... | F02D 41/144 701/108 |
| 2009/0038308 A1 * | 2/2009 | Nagae | ..................... | F01N 3/035 60/602 |
| 2009/0107225 A1 * | 4/2009 | Ishizuka | ............. | F02D 41/1498 73/114.15 |
| 2010/0070122 A1 * | 3/2010 | Niimi | .................... | B60K 6/445 701/22 |
| 2011/0184632 A1 * | 7/2011 | Kang | .................. | F02D 41/0007 701/109 |
| 2011/0208408 A1 * | 8/2011 | Haskara | ................ | F02D 35/023 701/105 |
| 2012/0186564 A1 * | 7/2012 | Vigild | ................. | F02D 41/1448 123/559.1 |
| 2014/0188371 A1 * | 7/2014 | Miyaji | .................. | F02D 41/123 701/103 |
| 2014/0251285 A1 * | 9/2014 | Surnilla | ................... | F02B 47/08 123/520 |
| 2015/0075503 A1 * | 3/2015 | Surnilla | ............. | F02M 25/0854 123/520 |
| 2015/0121864 A1 * | 5/2015 | Surnilla | ............. | F02D 41/0052 60/605.2 |
| 2015/0128917 A1 * | 5/2015 | Surnilla | ............. | F02D 41/0087 123/568.16 |
| 2015/0240730 A1 * | 8/2015 | Styles | ................... | F02D 41/144 123/393 |
| 2015/0252745 A1 * | 9/2015 | Naruse | .................. | F02D 35/028 123/294 |
| 2015/0292423 A1 * | 10/2015 | Pohlkamp | ........... | F02D 41/0077 701/22 |
| 2015/0292429 A1 * | 10/2015 | Surnilla | ................ | F02D 41/144 701/108 |
| 2015/0330326 A1 * | 11/2015 | Shaver | ................ | F02D 41/0062 123/445 |
| 2016/0290255 A1 * | 10/2016 | Miyahara | ................ | F02D 41/18 |

FOREIGN PATENT DOCUMENTS

| | | |
|---|---|---|
| DE | 102010046703 A1 | 3/2012 |
| DE | 102011009114 A1 | 3/2012 |
| EP | 1336745 A2 | 8/2003 |
| GB | 2475521 A | 5/2011 |

* cited by examiner

METHOD AND DEVICE FOR CONTROLLING A MOTOR-VEHICLE INTERNAL COMBUSTION ENGINE FITTED WITH A FUEL INJECTION SYSTEM AND AN EXHAUST GAS RECIRCULATION SYSTEM

CROSS-REFERENCE TO RELATED APPLICATIONS

This application claims priority to German Patent Application No. 102015216139.0, filed Aug. 24, 2015, and to German Patent Application No. 102015216138.2, filed Aug. 24, 2015, the entire contents of each of which is hereby incorporated by reference for all purposes.

FIELD

The invention relates to a method for controlling a motor-vehicle internal combustion engine fitted with a fuel injection system and an exhaust gas recirculation system and to a corresponding device for controlling an internal combustion engine of this kind.

BACKGROUND/SUMMARY

Internal combustion engines, especially internal combustion engines used in motor vehicles, are nowadays generally fitted with a fuel injection system, e.g., a direct injection system. In this case, a control unit of the internal combustion engine determines, in particular, the start and end time of the fuel injection in such a way that the fuel quantity injected corresponds to a setpoint fuel quantity, which is determined, in particular, from the respective operating conditions. To ensure that the fuel quantity envisaged under the relevant conditions is fed to all the cylinders during operation and that as far as possible the same fuel quantity is fed to all the cylinders, the injection valves used in this context are specified with tight tolerances for the flow rate. Nevertheless, deviations from the setpoint fuel quantity can occur, e.g., due to deposits in the injection nozzles over the life of the engine. Such deviations can cause an exhaust gas composition which is unfavorable for exhaust gas aftertreatment, for example, can lead to unequal torque from the individual cylinders and hence to torsional vibrations in the drive train and can result in an increase in fuel consumption. For this reason, methods have been developed to determine the fuel quantity actually injected into a cylinder of the internal combustion engine and to adapt the injection parameters accordingly on this basis, for example, thus allowing the envisaged fuel quantity to be fed to the cylinder during the operation of the internal combustion engine.

DE 10 2010 036 485 B3 discloses a method for controlling an internal combustion engine having a fuel injection system, wherein an injection duration of an injection valve of the internal combustion engine is modified, an exhaust gas composition of the internal combustion engine is measured, a deviation in a flow through the injection valve from a nominal value is determined from the exhaust gas composition, and the injection valve is activated with an injection duration adapted to the compensation of the deviation determined.

According to EP 1 336 745 A2, the intake mass flow and air ratio in the exhaust gas are measured in a method for controlling the injection in a motor-vehicle internal combustion engine in order to estimate the fuel quantity which has actually been injected into the engine. By means of a closed control loop, it is ensured that the estimated fuel quantity is substantially equal to a setpoint fuel quantity calculated to meet the requirements of a user of the motor vehicle. Here, the difference between the setpoint fuel quantity and the estimated fuel quantity is used to calculate a correction factor with which the setpoint fuel quantity is corrected.

GB 2 475 521 A discloses a method for determining the actually injected fuel quantity in an internal combustion engine, wherein a setpoint test fuel quantity is injected into a cylinder in an operating state without fuel supply, the air quantity which flows into the cylinder during the test injection is determined by means of an air mass flow sensor, the air ratio in the exhaust gas is determined by means of a lambda probe, and the fuel quantity injected in the test injection is calculated on the basis of a function of the air quantity which has flowed in the cylinder and on the basis of the air ratio. The fuel quantity injected in the test injection can be compared with a setpoint fuel quantity in order to correct injection, e.g. by corresponding adjustment of the activation duration of the injection valve.

However, the inventors herein have recognized an issue with the above approaches. In one example, the approach described above, wherein the fuel quantity injected in the test injection is calculated on the basis of a function of the air quantity which has flowed in the cylinder and on the basis of the air ratio, may lead to inaccurate fuel injection corrections owing to the difficulty of measuring the air quantity which flows into the cylinder during the test injection and/or due to a deviation in the air quantity measurement due to, for example, humidity. For example, the air mass flow sensor may determine the air mass flowing to each cylinder, and it may be difficult to estimate how much air actually flowed to the cylinder receiving the test injection.

Thus, the inventors herein provide an approach to at least partly address the above issues. In one example, a method includes, in a deceleration phase, forming a closed exhaust gas recirculation circuit, determining a mass ($m_{circ}$) of an air quantity enclosed in the closed exhaust gas recirculation circuit, detecting a first oxygen content of the air quantity, carrying out a test injection with an injection valve, detecting a second oxygen content of the air quantity, and determining a fuel mass ($m_{fuel}$) injected in the test injection from the mass ($m_{circ}$) of the air quantity and the first and the second oxygen contents.

In this way, the mass of air enclosed in the closed exhaust gas recirculation (EGR) circuit may be determined, which may be more accurate than measuring the air mass flowing to a single cylinder. The amount of oxygen consumed by the injected fuel in the test injection may be determined by the difference between the first and second oxygen contents, and the amount of consumed oxygen used to determine the actual amount of fuel delivered during the test injection. In one example, if the amount of fuel injected during the test injection is different than expected, future fuel injection amounts may be adjusted accordingly, thus increasing the accuracy of the delivered fuel injection amounts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The disclosure relates to an internal combustion engine, which drives a motor vehicle and, in particular, is a diesel or spark-ignition engine. The internal combustion engine has a fuel injection system and comprises one or more cylinders, wherein at least one injection valve is assigned to each cylinder to feed fuel into a combustion chamber of the cylinder. The disclosure relates, in particular, to a direct injection system.

The internal combustion engine is furthermore fitted with an exhaust gas recirculation system. By the exhaust gas recirculation system, some of the exhaust gases from the internal combustion engine can be fed back into the intake tract from the exhaust tract via an exhaust gas recirculation line, thereby making it possible, in particular, to achieve a reduction in pollutant emissions. The internal combustion engine may include an exhaust turbocharger. The turbocharger has a turbine, which is arranged in the exhaust gas flow and which drives a compressor arranged in the intake tract, which is used to compress the charge air fed to the engine, it being possible for said charge air to be a mixture of fresh air and recirculated exhaust gas. It is thereby possible to achieve an increase in power. The exhaust gas recirculation system is preferably a low-pressure exhaust gas recirculation system, wherein exhaust gas is removed downstream of the turbine of the turbocharger and fed into the charge air drawn in upstream of the compressor of the turbocharger.

In a method according to the disclosure, a closed exhaust gas recirculation circuit is formed in a deceleration phase, e.g., under operating conditions of the internal combustion engine in which no engine power is used to drive the motor vehicle. In a closed circuit of this kind, full exhaust gas recirculation from the exhaust tract of the internal combustion engine into the intake tract thereof takes place. For this purpose, corresponding valves are moved into a position such that the entire exhaust gas flow from the internal combustion engine is passed through an exhaust gas recirculation line into the intake tract, and no fresh air is supplied in the intake tract. As long as the closed circuit is in existence, an air quantity that is not subject to exchange with the ambient air is enclosed in said circuit. Since the internal combustion engine is driven by the kinetic energy of the motor vehicle in the deceleration phase, there is a flow of the enclosed air quantity within the closed circuit. Here and in the text which follows, the term "air" may be used, referring to the enclosed gas, which also contains, in particular, the exhaust gas formed by combustion.

According to the disclosure, the air mass enclosed in the closed exhaust gas recirculation circuit is determined, e.g., the mass of the enclosed air quantity is determined. For this purpose, sensor signals for detecting appropriate measured variables may be evaluated, and the known volume of the closed circuit, which is specified to correspond to the specific type involved, and optionally further parameters are taken into account. Detection of the measured variables and determination of the enclosed air mass may take place immediately after the creation of the closed exhaust gas recirculation circuit or at a later time, e.g., during the method steps described below, as long as the exhaust gas recirculation circuit is closed.

Furthermore, according to the disclosure, at least one first oxygen content of the enclosed air quantity is detected at a first time. From the detected oxygen content, it is possible to infer the proportion of oxygen consumed by combustion of the fuel and hence, taking into account the air mass enclosed in the circuit, to infer a fuel mass that has been burnt. Fuel, which may be a small quantity of fuel, is then injected into one cylinder of the internal combustion engine in a test injection using an injection valve associated with said cylinder. The other injection valves of the internal combustion engine are not activated for fuel injection during this process. The fuel fed in by the test injection is burnt within the closed circuit, e.g., in the combustion chamber of the relevant cylinder or, alternatively, by an exhaust tract catalyst situated within the closed exhaust gas recirculation circuit. The burnt fuel remains in the closed circuit and can disperse therein. At a second time after the test injection has been carried out, at least one second oxygen content of the enclosed air quantity is furthermore detected. From this it is possible to infer the oxygen content consumed by fuel combustion at the second time and thus, taking into account the air mass enclosed in the closed circuit, to infer the fuel mass burnt at this time. After the second time or, alternatively, at a later time, e.g. at the end of the deceleration phase, the closed exhaust gas recirculation circuit can be opened again, i.e. the supply of fresh air and exhaust gas recirculation are once again set in accordance with normal operation of the internal combustion engine.

According to the disclosure, the fuel mass injected in the test injection is determined from the mass of the enclosed air quantity and the at least one first and the at least one second oxygen content. In particular, taking into account the mass of the enclosed air quantity, the fuel mass burnt at the first time is inferred from the at least one first oxygen content, and the fuel mass burnt at the second time is inferred from the at least one second oxygen content, wherein the fuel mass injected in the test injection is the difference between the burnt fuel masses determined in this way. Since the fuel quantity injected can be specified by the corresponding fuel mass, the term "fuel quantity" is also used below.

Owing to the fact that in each case at least one oxygen content is measured in a closed exhaust gas recirculation circuit at a time before a test injection and at a time after a test injection, it is possible to infer the proportion of oxygen consumed in the enclosed air quantity and thereby to infer the fuel mass injected in the test injection. It is thereby possible to determine in a simple way the fuel quantity actually injected in the test injection. In particular, the actually injected fuel quantity can be determined without using a mass flow sensor; as a result, the injected fuel quantity can be determined in a particularly accurate way because the enclosed air mass can often be determined more precisely than the mass flow. The fuel quantity determined in this way can be used for improved control of the internal combustion engine and/or of additional equipment of the internal combustion engine.

According to an embodiment of the disclosure, the exhaust tract of the internal combustion engine has an exhaust valve arranged downstream of a branch in an exhaust gas recirculation line, the intake tract of the internal combustion engine has an intake throttle valve, and the exhaust gas recirculation line has an exhaust gas recirculation valve. To form a closed exhaust gas recirculation circuit, the exhaust valve is here activated in such a way that the branch of the exhaust tract through which the exhaust gas emerges into the environment is completely closed, with the result that the entire exhaust gas flow is passed into the exhaust gas recirculation line. The intake throttle valve is furthermore activated for complete closure of the intake line, ensuring that there is no supply of fresh air, and the exhaust gas recirculation valve is opened. As an alternative, a three-way valve can be provided in the intake tract; in this case, the closed exhaust gas recirculation circuit is formed by activating the three-way valve in such a way that the supply of fresh air is completely closed and the exhaust gas recirculation line is completely opened. Here too, the exhaust valve is in a position such that emergence of the exhaust gas from the exhaust tract into the environment is completely prevented. In this way, a closed exhaust gas recirculation circuit can be formed by the valves provided for controlling exhaust gas recirculation and the supply of fresh air.

The mass of the air quantity enclosed in the closed exhaust gas recirculation circuit may be determined by at least one pressure sensor and at least one temperature sensor. The known volume of the closed exhaust gas recirculation circuit and the volumetric efficiency of the cylinders of the internal combustion engine can furthermore be taken into account. The pressure sensor and the temperature sensor are preferably arranged in the intake tract of the internal combustion engine, in particular in the intake pipe. To control the internal combustion engine and the exhaust gas aftertreatment system of the internal combustion engine, one or more further temperature sensors can be present, e.g., in the exhaust tract and/or in the exhaust gas recirculation line. If a plurality of pressure and/or temperature sensors is present, these can each be used to determine the mass of a corresponding partial volume of the enclosed air quantity. In determining the mass of the air volume within the cylinder or cylinders of the internal combustion engine, it is possible to take into account the volumetric efficiency of the cylinders. In this way, particularly accurate determination of the enclosed air mass is possible.

A first waiting time may be observed after the formation of the closed exhaust gas recirculation circuit and before the determination of the at least one first oxygen content. In particular, this waiting time is determined in such a way that the internal combustion engine has carried out a sufficient number of revolutions to uniformly mix the air quantity enclosed in the closed circuit and circulating in the latter. Here, non-uniform filling of the cylinders into which the test injection has been performed can contribute to the uniform mixing, as it can in the case of the remaining cylinders in an internal combustion engine having a plurality of cylinders. As an alternative or in addition, a second waiting time, within which the internal combustion engine has likewise carried out a sufficient number of revolutions to uniformly mix the air quantity enclosed in the closed circuit, can be observed after the test injection is carried out and before the at least one second oxygen content is determined. As a particularly preferred option, both a first and a second waiting time are provided. More accurate detection of the oxygen content of the enclosed air quantity and hence more accurate determination of the injected fuel mass are thereby possible.

The first and the second oxygen contents may be detected by at least one oxygen sensor arranged in the exhaust tract and/or at least one oxygen sensor arranged in the intake tract, e.g., in each case one lambda probe. According to an embodiment of the invention, provision is made for the first and the second oxygen contents of the enclosed air quantity to be measured by an oxygen sensor arranged in the exhaust tract and additionally by an oxygen sensor arranged in the intake tract. The oxygen sensor or lambda probe may be arranged in the exhaust tract upstream of a catalyst. The oxygen sensor or lambda probe in the intake tract may be arranged in the intake pipe of the internal combustion engine. It is thereby possible in each case to carry out two independent measurements of the first and the second oxygen content of the enclosed air quantity, allowing redundant determination of the fuel quantity injected in the test injection. In an example, provision can be made for an average to be formed from the respectively determined fuel masses. It is thereby possible to determine the actually supplied fuel quantity with increased accuracy.

According to an embodiment of the disclosure, the measurement of the first oxygen content, the test injection, and the measurement of the second oxygen content as well as the determination, based thereon, of the injected fuel quantity in the case of internal combustion engine having a plurality of injection valves assigned, in particular, to a plurality of cylinders, are carried out for each injection valve of the internal combustion engine, wherein no fuel is injected by the other injection valves between the measurement of the first oxygen content and that of the second oxygen content. Provision can be made here for the steps mentioned to be carried out in succession for a plurality of injection valves or for all the injection valves of the internal combustion engine after the closed exhaust gas recirculation circuit has been created and before the closed exhaust gas recirculation circuit is reopened. Provision is preferably made for the closed exhaust gas recirculation circuit to be formed, for the steps mentioned to be carried out for a first injection valve, then for the closed exhaust gas recirculation circuit to be reopened and the injected fuel quantity to be determined for the first injection valve; after a respective waiting time of a few revolutions of the internal combustion engine, a respective further deceleration phase, a corresponding procedure is followed to determine the injected fuel quantity for each further injection valve of the internal combustion engine. It is thereby possible to determine the injected fuel quantity precisely for all the injection valves of the internal combustion engine.

An exhaust gas aftertreatment system of the internal combustion engine may be controlled on the basis of the fuel mass injected in a test injection, which is determined as described, or on the basis of the respective injected fuel mass determined for each injection valve of the internal combustion engine. For example, provision can be made for this to be used to determine the fuel mass actually supplied in at least one further injection, in particular in the injections during normal operation. Thus, it can frequently be assumed that the fuel mass actually injected in an injection during normal operation differs from a setpoint fuel mass approximately in the same proportion as the fuel mass actually injected in the test injection differs from a setpoint fuel mass of the test injection. Determining the actually injected fuel quantity allows better activation of an exhaust gas aftertreatment system of the internal combustion engine and hence a reduction in pollutant emissions.

According to an embodiment of the disclosure, a correction of the at least one injection parameter is determined from at least one injection parameter of the test injection and from the fuel mass determined, which has actually been injected in the test injection. In particular, this is determined in such a way that the actually injected fuel mass would be equal to a setpoint fuel mass of the test injection with an appropriately corrected injection parameter. This correction is used in at least one further injection, in particular in the injections which take place after the end of the deceleration phase during normal operation of the internal combustion engine, in order to adapt the at least one injection parameter of the at least one further injection in such a way that the fuel mass actually injected into the cylinder is equal to (or within a threshold range of) the respective setpoint fuel mass determined from the demanded torque and the operating parameters of the internal combustion engine. In particular, it is possible, if the fuel mass injected in a respective test injection has been determined for all the injection valves of the internal combustion engine, to determine a separate correction for each injection valve, this being used in each case for the appropriate adaptation of the at least one injection parameter during the injections in normal operation. Improved control of the internal combustion engine and, in particular, more economical operation can thereby be achieved. If a corresponding adaptation of the at least one injection parameter is performed for each cylinder of the internal combustion engine, at the at least one injection valve associated with the respective cylinder, it is furthermore possible to avoid the generation of unequal torques by the individual cylinders and hence the formation of torsional vibrations.

In particular, the at least one injection parameter can be the injection duration. The fuel quantity actually fed to the combustion chamber in the test injection depends inter alia on the flow rate, e.g., on the fuel quantity flowing through the injection valve per unit time, and the injection duration. In particular, the actually injected fuel quantity can deviate from a specified setpoint fuel quantity because the flow rate deviates from a nominal value, owing to the deposits in the injection nozzle, for example. Since the fuel quantity injected to drive the motor vehicle during the operation of the internal combustion engine also depends on the flow rate, it is thereby possible in most cases to infer a deviation in the fuel quantity actually injected during operation from a setpoint fuel quantity. By a corresponding correction or adaptation of the injection duration, it is therefore possible in a simple manner to correct a deviation in the actually injected fuel quantity, thus ensuring that a respective setpoint fuel quantity is actually achieved with a greater accuracy in the subsequent injections during the operation of the internal combustion engine.

A device according to the disclosure for controlling a motor-vehicle internal combustion engine that has a fuel injection system and an exhaust gas recirculation system, comprises a control unit storing instructions in memory that are executable by the control unit to carry out the above-described method for controlling the internal combustion engine. For this purpose, the control unit may include instructions for activating an exhaust valve and, on the one hand, an intake throttle valve and an exhaust gas recirculation valve or, on the other hand, a three-way valve in the intake tract of the internal combustion engine in order to create a closed exhaust gas recirculation circuit in a deceleration phase of the motor vehicle. The control unit furthermore includes instructions to activate at least one injection valve of the cylinder to carry out a test injection. The control unit furthermore includes instructions to detect the sensor signals of an oxygen sensor, in particular a lambda probe, arranged in the intake tract and/or an oxygen sensor, in particular a lambda probe, arranged in the exhaust tract and of a pressure sensor and of a temperature sensor, which are arranged in the intake pipe of the internal combustion engine, for example, and to determine the fuel mass actually injected in the test injection from the mass of the enclosed air quantity and from the first and the second oxygen content. The control unit may comprise a processor for calculating the actually injected fuel quantity. The control unit may be part of an electronic engine control system of the internal combustion engine and may also include instructions to detect a deceleration phase of the motor vehicle, for example. The device for controlling the internal combustion engine may furthermore comprise the sensors for detecting the first and the second oxygen content and for determining the enclosed air mass.

Figure 1:
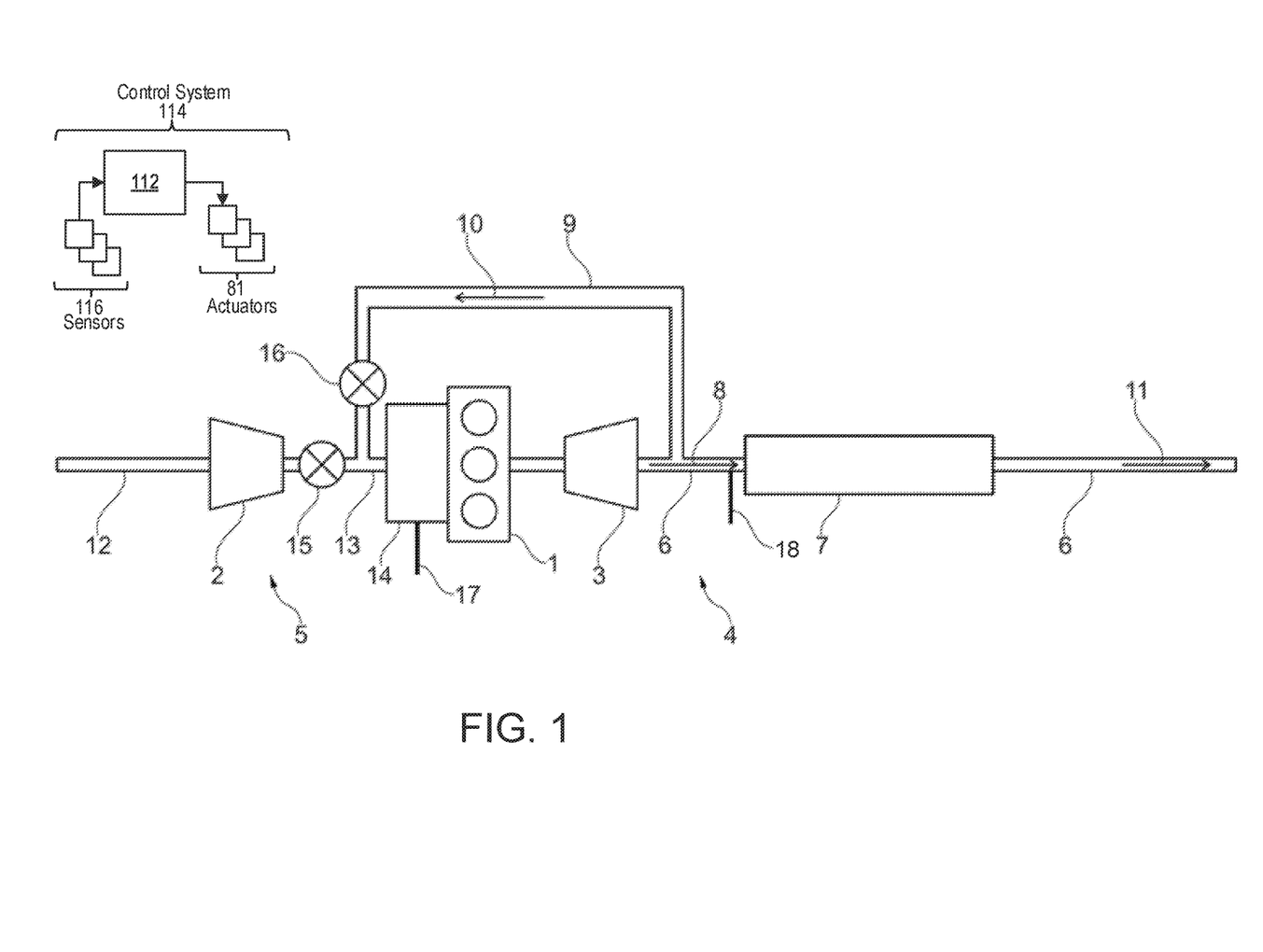
FIG. 1 shows a first illustrative embodiment of an exhaust gas recirculation system according to the disclosure.
Figure 2:
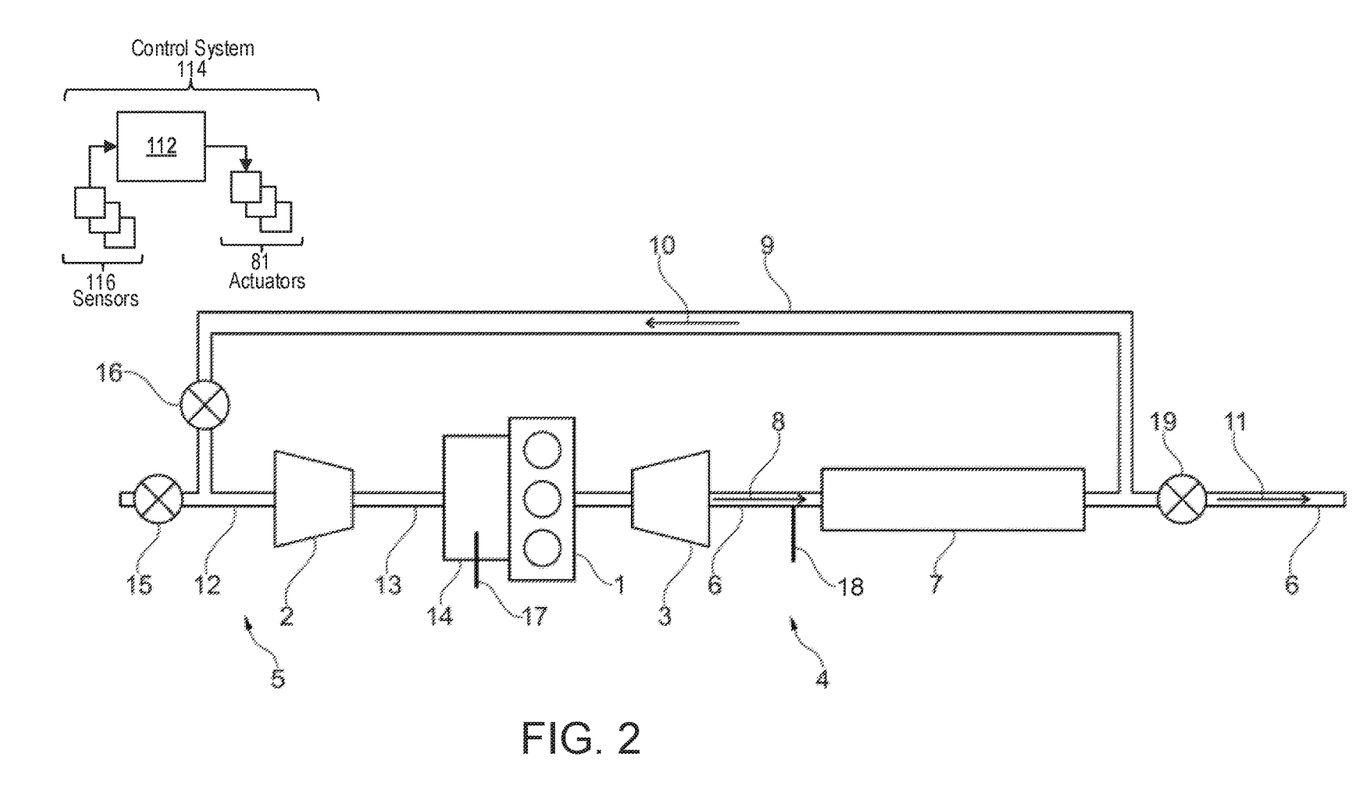
FIG. 2 shows a second illustrative embodiment of an exhaust gas recirculation system according to the disclosure.
Figure 3:
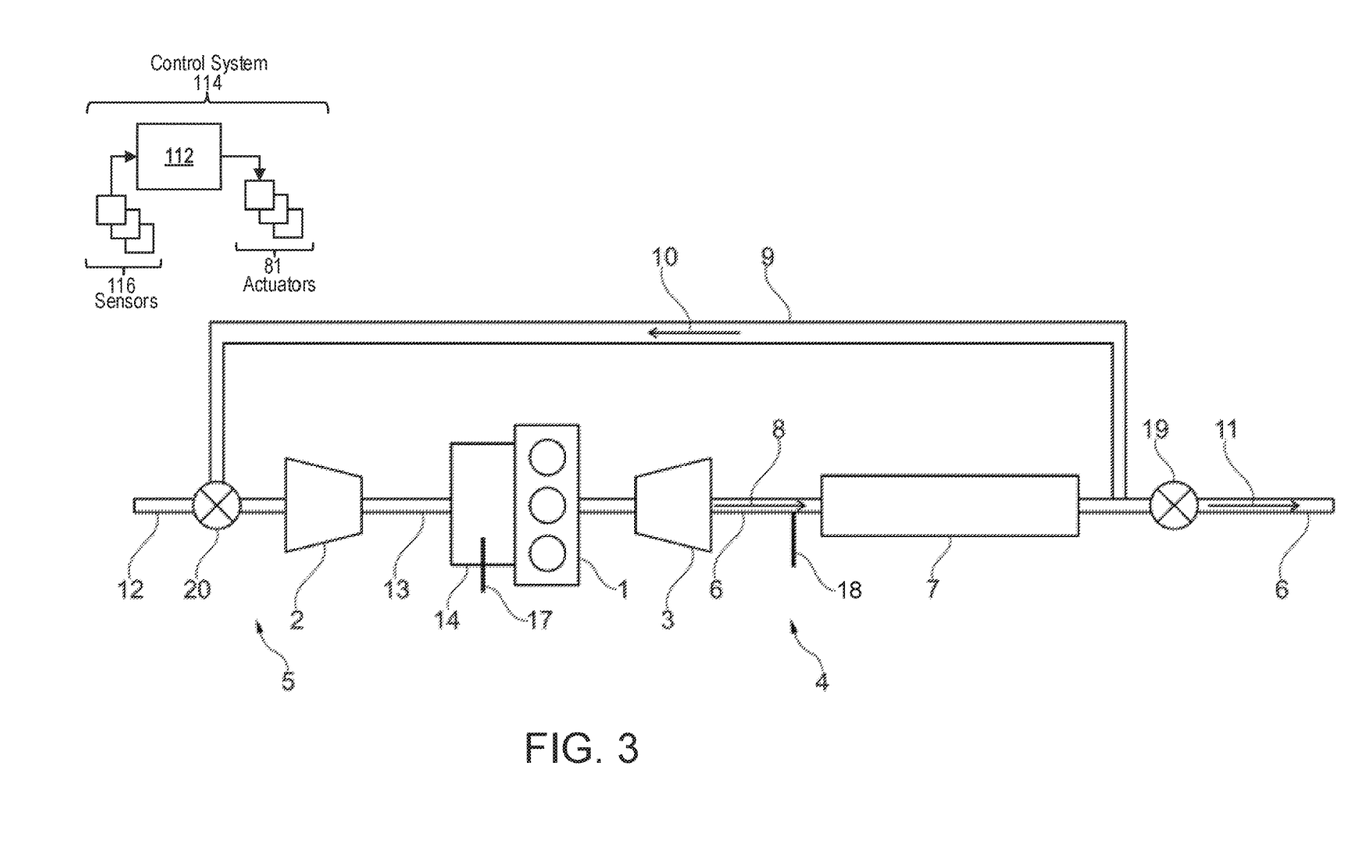
FIG. 3 shows a third illustrative embodiment of an exhaust gas recirculation system according to the disclosure.

Three illustrative embodiments of an exhaust gas recirculation system of a motor vehicle are shown in FIGS. 1-3, wherein the exhaust gas recirculation system is suitable for carrying out one or more methods according to the disclosure. Here, the exhaust gas recirculation system is either a low-pressure exhaust gas recirculation system (FIGS. 2-3) or a high-pressure exhaust gas recirculation system (FIG. 1).

As illustrated symbolically and by way of example in FIG. 1, an internal combustion engine 1 of a motor vehicle includes an exhaust turbocharger, which comprises a compressor 2 and a turbine 3. The turbine 3, which is arranged in the exhaust tract 4 of the internal combustion engine 1, receives exhaust gas flow of the internal combustion engine 1 and is thereby driven. Via a turbine shaft (not shown in FIG. 1), the turbine 3 drives the compressor 2, which is arranged in the intake tract 5 and which feeds compressed charge air to the internal combustion engine 1.

From the turbine 3 of the turbocharger, the exhaust gas passes through an exhaust line 6 into an exhaust gas aftertreatment system, which is formed by a catalyst 7 in the illustrative embodiment shown. The direction of flow of the exhaust gas in the exhaust line 6 is indicated by arrow 8 in FIG. 1. Branching off from the exhaust line 6 downstream of the turbine 3 and upstream of the catalyst 7 is an exhaust gas recirculation line 9, through which some of the exhaust gas can be recirculated into the intake tract 5 of the internal combustion engine 1; the direction of flow of the recirculated portion of the exhaust gas is indicated by arrow 10. The remaining portion of the exhaust gas flows through the catalyst 7 and onward through the exhaust line 6 in the direction of arrow 11, if appropriate through a further exhaust gas aftertreatment system, and is finally released to the environment.

The compressor 2 compresses fresh air, which is drawn in via the intake line 12, and feeds this to the internal combustion engine 1 via a charge air feed 13 and an intake pipe 14. Downstream of the compressor 2, the exhaust gas recirculation line 9 opens into the charge air feed 13, with the result that the recirculated exhaust gas together with the fresh air drawn in via the intake line 12 and compressed by the compressor 2 is fed as compressed charge air to the internal combustion engine 2 via the intake pipe 14. An intake throttle valve 15 is arranged on the charge air feed 13, upstream of the entry of the exhaust gas recirculation line 9, and an exhaust gas recirculation valve 16 is arranged on the exhaust gas recirculation line 9, upstream of the entry into the intake line 13. The intake throttle valve 15 and the exhaust gas recirculation valve 16 may be activated by a control unit 112 in order to adjust the proportion of fresh air and the proportion of exhaust gas and hence the mixing ratio of fresh air and exhaust gas in the charge air fed to the internal combustion engine 1. As indicated symbolically in FIG. 1, a plurality of charge air sensors 17 is arranged in the intake pipe 14, said sensors detecting at least the temperature, pressure, and oxygen content of the compressed charge air fed to the internal combustion engine 1. In particular, the charge air sensors 17 comprise a temperature sensor, a pressure sensor, and a lambda probe. Moreover, a further lambda probe 18 for detecting the oxygen content of the exhaust gas is arranged on the exhaust line 6, downstream of the exhaust gas recirculation line 9 and upstream of the catalyst 7. The charge air sensors 17 and the further lambda probe 18 arranged in the exhaust gas flow are connected to the control unit 112.

The engine is controlled by a control system 114. Control system 114 is shown receiving information from a plurality of sensors 116 and sending control signals to a plurality of actuators 81. As one example, sensors 116 may include various pressure and temperature sensors, a fuel level sensor, various exhaust gas sensors, torque sensors, and so on, as well as the charge air sensors 17 and further lambda probe 18. The control system 114 may also send control signals to the actuators 81 based on input received from a vehicle operator and the plurality of sensors 116. The various actuators may include, for example, cylinder fuel injectors, an air intake throttle coupled to the engine intake manifold, the valves 15, 16, 19, and/or 20 (described below), and so on. The control system 114 may include a control unit 112. The control unit may receive input data from the various sensors or buttons, process the input data, and trigger the actuators in response to the processed input data based on instructions or code programmed therein corresponding to one or more routines. Example control routines are described herein with regard to FIGS. 4 and 5.

The control unit receives signals from the various sensors of FIG. 1 and employs the various actuators of FIG. 1 to adjust engine operation based on the received signals and instructions stored on a memory of the control unit. For example, as explained in more detail below, the control unit may receive signals from the charge air sensors 17 and/or the further lambda probe 18 and adjust parameters of one or more fuel injectors of the engine in response to the received signals.

In the second illustrative embodiment of an exhaust gas recirculation system, which is illustrated symbolically in FIG. 2, the exhaust gas recirculation line 9 branches off from the exhaust line 6 downstream of the catalyst 7. An exhaust valve 19, which can be activated by the control unit 112 in order to adjust the proportion of exhaust gas recirculated, is arranged on the exhaust line 6, downstream of the branch of the exhaust gas recirculation line 9. The exhaust gas recirculation line 9 opens into the intake line 12 upstream of the compressor 2, with the result that the recirculated exhaust gas is fed to the compressor 2 together with the fresh air drawn in via the intake line 12. The compressor 2 compresses the mixture of fresh air and recirculated exhaust gas and feeds this to the internal combustion engine 1 as compressed air via the charge air feed 13 and the intake pipe 14. The intake throttle valve 15 is arranged on the intake line 12 upstream of the entry of the exhaust gas recirculation line 9. In other respects, the illustrative embodiment shown in FIG. 2 is configured like that shown in FIG. 1.

In the case of the third illustrative embodiment of an exhaust gas recirculation system, which is illustrated symbolically in FIG. 3, a three-way valve 20 is provided instead of the intake throttle valve 15 and of the exhaust gas recirculation valve 16, said three-way valve being arranged at the entry of the exhaust gas recirculation line 9 into the intake line 12. The three-way valve 20 may be activated by the control unit to adjust the mixing ratio of fresh air and recirculated exhaust gas in the charge air. In other respects, the illustrative embodiment shown in FIG. 3 is configured like that shown in FIG. 2.

Figure 4:
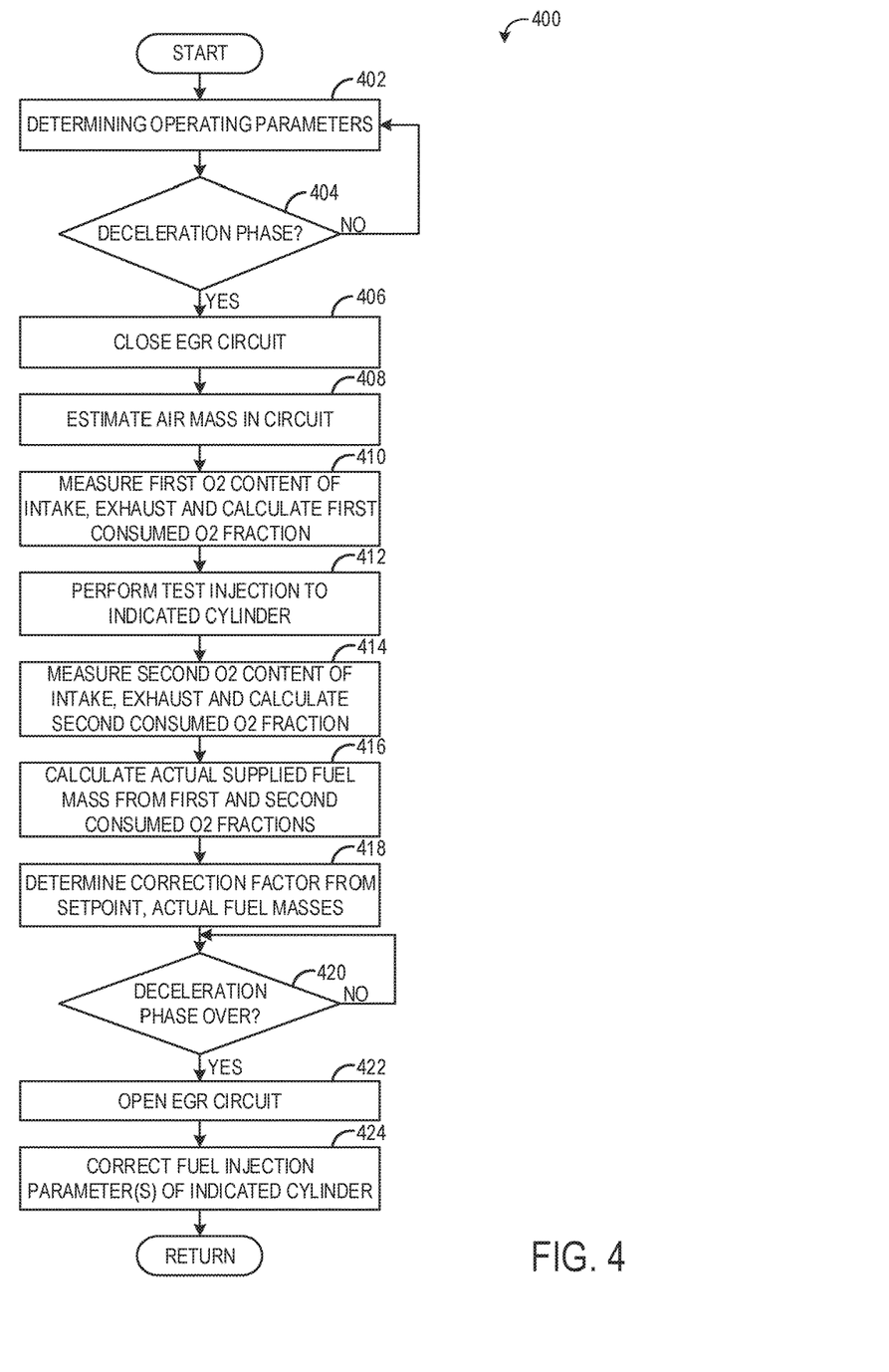
FIG. 4 shows a flow diagram for an embodiment of a method according to the disclosure.

An illustrative embodiment of a method 400 according to the disclosure is shown in simplified form in a flow diagram in FIG. 4. Instructions for carrying out method 400 and the rest of the methods included herein may be executed by a control unit, such as control unit 112, based on instructions stored on a memory of the control unit and in conjunction with signals received from sensors of the engine system, such as the sensors described above with reference to FIGS. 1-3. The control unit may employ engine actuators of the engine system to adjust engine operation, according to the methods described below.

At 402, method 400 determines operating parameters. The operating parameters determined may include vehicle speed, engine speed, engine load, accelerator and/or brake pedal position, etc. At 404, method 400 determines if the engine is operating in a deceleration phase. It may be established that the motor vehicle is in a deceleration or overrun phase the basis of the signal of a speed sensor of the motor vehicle and of the position of the accelerator pedal and, if appropriate, of the brake pedal of the motor vehicle. In one example, the deceleration phase may be initiated when engine load is below a threshold load, vehicle speed is above a threshold speed, and/or the brake pedal is not depressed. During the deceleration phase, the vehicle may be propelled via its own momentum and hence engine operation is not used to propel the vehicle. As such, fuel injection may be ceased.

If the engine is not operating in a declaration phase, method 400 returns to 402 to continue to assess operating parameters. If the engine is operating in a deceleration phase, method 400 proceeds to 406 to produce a closed exhaust gas recirculation circuit. The closed exhaust gas recirculation circuit is an exhaust gas recirculation circuit with an exhaust gas recirculation rate of 100%. For this purpose, the exhaust valve 19 (see FIGS. 2 and 3) is closed by the control unit. In the illustrative embodiment shown in FIG. 2, the intake throttle valve 15 is closed and the exhaust gas recirculation valve 16 is open; in the embodiment according to FIG. 3, the three-way valve 20 is activated in such a way that the intake line 13 is closed on the inlet side and the exhaust gas recirculation line 9 is open.

At 408, after a first waiting time $t_1$, which may include a few revolutions of the internal combustion engine (e.g., 3-5 revolutions), thus ensuring that the air quantity and closed in the closed exhaust gas recirculation circuit is uniformly mixed, the mass $m_{circ}$ of the enclosed air quantity in different pieces of the enclosed volume is estimated from the universal gas law for ideal gases:

$$m_{circ} = \Sigma p_i V_i / RT_i,$$

where R is the specific gas constant. The pressure p and the temperature T are measured by the charge air sensors 17. For the gas in the cylinders, the volume V of the closed exhaust gas recirculation circuit is known, and the likewise known volumetric efficiency of the cylinders of the internal combustion engine is taken into account. As used herein, the volumetric efficiency may include an amount of air the cylinders are able to induct. The air mass $m_{circ}$ may also be determined at some other time, e.g., after the test injection.

At 410, method 400 includes measuring a first O2 content of the intake and a first O2 content of the exhaust and calculating a first consumed O2 fraction of each of the intake and exhaust. The proportion of oxygen $O_{2,exh1}$ (in percent) in the exhaust tract 4 is measured by the lambda probe 18, and the proportion of oxygen $O_{2,man1}$ (in percent) in the intake tract 5 is measured by the lambda probe of the charge air sensors 17. These are used respectively to calculate the proportion of oxygen which has been consumed in the enclosed air quantity in the exhaust tract ($f_{exh1}$) and in the intake tract ($f_{man1}$) as follows, where 21 represents the percentage of oxygen in ambient air:

$$f_{exh1}=1-O_{2,exh1}/21$$

$$f_{man1}=1-O_{2,man1}/21$$

At 412, a test injection into an indicated cylinder of the internal combustion engine is then carried out, wherein the injection parameters are known and, in particular, the injection duration $T_{inj,test}$ is chosen so as to supply a setpoint fuel mass $m_{test,soll}$. At 414, method 400 measures a second O2 content of the intake and a second O2 content of the exhaust and calculates a second consumed O2 fraction for each of the intake and the exhaust. After a second waiting time $t_2$, which again may last for a few revolutions of the internal combustion engine, thus ensuring that the air quantity enclosed in the closed exhaust gas recirculation circuit is uniformly mixed, the proportion of oxygen $O_{2,exh2}$ in the exhaust tract 4 is measured by the lambda probe 18, and the proportion of oxygen $O_{2,man2}$ in the intake tract 5 is measured by the lambda probe of the charge air sensors 17. These are used respectively to calculate the proportion of oxygen which has been consumed in the enclosed air quantity in the exhaust tract ($f_{exh1}$) and in the intake tract ($f_{man1}$)

$$f_{exh2}=1-O_{2,exh2}/21$$

$$f_{man2}=1-O_{2,man2}/21$$

At 416, an actual supplied fuel mass is calculated from the first and second consumed O2 fractions. Thus, the results of the calculation of the proportion of oxygen which has been consumed in the enclosed air quantity in the exhaust tract and in the intake tract are used respectively to calculate a fuel mass actually supplied in the test injection:

$$m_{fuel,exh}=(f_{exh2}-f_{exh1})m_{circ}/(1+\varphi_{stoich})$$

$$m_{fuel,man}=(f_{exh2}-f_{exh1})m_{circ}/(1+\varphi_{stoich})$$

where $\varphi_{stoich}$ is the stoichiometric air/fuel ratio. From the two values determined in this way, the fuel mass $m_{fuel}$ actually supplied can be determined more accurately, e.g. by averaging:

$$m_{fuel}=(m_{fuel,exh}+m_{fuel,man})/2$$

At 418, a correction factor $$F_{corr}=m_{fuel}/m_{test,soll}$$

is determined from the setpoint fuel mass and the actual fuel mass, indicating by what factor the fuel quantity actually supplied has changed relative to the setpoint fuel quantity.

At 420, method 400 determines if the deceleration phase has ended e.g. through actuation of the accelerator pedal by the driver of the motor vehicle. If the deceleration phase has not ended, method 400 continues to wait until the deceleration phase ends. During this time, fuel injection to the cylinders may be maintained off and the EGR circuit may be kept closed. However, in some examples, the EGR circuit may be opened to expel the exhaust gas to atmosphere, and after a duration, the EGR circuit may again be closed and another text injection performed for a different cylinder (along with the corresponding O2 fraction determinations).

If the deceleration phase has ended, method 400 proceeds to 422 to open the EGR circuit. Once the deceleration phase has ended, the exhaust valve 19, the intake throttle valve 15, and the exhaust gas recirculation valve 16 (see FIG. 2) or the three-way valve 20 (see FIG. 3) are activated in the manner corresponding to normal operation of the internal combustion engine, e.g., for partial exhaust gas recirculation. At 424, method 400 corrects one or more fuel injection parameters of the indicated cylinder. For an injection into the combustion chamber of the cylinder, a setpoint fuel mass to be supplied and an injection duration $T_{inj,soll}$ corresponding to the latter is determined from the demanded torque and the instantaneous speed of the internal combustion engine. This is corrected with the correction factor in order to determine a corrected or adapted injection duration $T_{inj}$:

$$T_{inj}=T_{inj,soll}/F_{corr}$$

This correction is used for the normal operation of the internal combustion engine, e.g., for operation outside the deceleration phase, and the injections are in each case carried out with an adapted injection duration $T_{inj}$. In this way, it is possible, in particular, to compensate a reduction in the flow through an injection valve by a corresponding extension of the injection duration.

Corresponding correction factors can be determined in succession for all the cylinders of the internal combustion engine and taken into account during injection in normal operation. The method described can be repeated regularly, e.g. performance of the method can be started again when a deceleration phase is detected after a time of operation of the motor vehicle within which a change in the flow through an injection valve can occur. Method 400 then returns.

Thus, method 400 described above may adjust one or more fuel injection parameters, such as fuel injection duration, of each fuel injector of an engine to ensure that a commanded amount of fuel is delivered from each fuel injector. To adjust the fuel injector parameter, a fuel injector correction factor may be determined for each fuel injector. The fuel injector correction factor may represent the difference (e.g., fraction) between a commanded or setpoint fuel injection amount for a test fuel injection event and the actual fuel injection amount delivered during the test fuel injection event. To measure the actual fuel injection amount, a closed EGR circuit is formed during a no-load condition of the engine where the engine is rotating. One example of a no load condition of the engine where the engine is rotating includes deceleration fuel shut-off (DFSO), also referred to as a deceleration phase, where the engine is rotated via its own inertia and fuel injection to the engine is shut off. However, other no load conditions may be possible, such as engine cranking during an engine start, or when a motor is rotating the engine. During the no-load condition, one or more valves in the EGR system may be adjusted such that all exhaust gas from the engine is routed back to the intake, and no fresh air enters the engine. Therein, the mass of gas in the closed EGR circuit may be measured and/or estimated, and due to the closed circuit, the mass will not change. The oxygen content of the gas in the circuit is measured and then a test injection event is performed. Upon combustion of the fuel delivered during the test fuel injection, the oxygen content of the gas in the circuit will change (e.g., decrease) and thus the oxygen content of the gas is again measured. The difference between the pre- and post-test injection oxygen contents may be used to calculate the delivered fuel mass. If this delivered fuel mass differs from the commanded fuel mass for the test fuel injection event, this difference may be used as the correction factor for future fuel injection events.

In some examples, it may be desirable to increase or decrease the amount of gas that will eventually be trapped in the closed EGR circuit, prior to entry into the deceleration phase. For example, if entry into a deceleration phase is predicted and an increase in the signal to noise ratio of the determination of the correction factor is desired, boost pressure may be increased prior to entry into the deceleration phase. The increase in boost pressure may increase the total mass of gas in the intake, engine, and exhaust. Then, once the deceleration phase is started and the respective valves are closed to form the closed EGR circuit, the mass of gas in the circuit may be larger relative to a mass that would have been present had boost pressure remained constant prior to entry into the deceleration phase. The larger mass of gas may allow for a larger test fuel injection amount, and hence the change in oxygen content resulting from combustion of the test fuel injection may be larger, which may increase the ability to detect the change and calculate a correction factor.

Conversely, it may be desirable under some conditions to reduce the mass of gas trapped in the closed EGR circuit, as a smaller gas mass may allow for a smaller test fuel injection amount. With a smaller test fuel injection amount, any torque disturbances resulting from the test fuel injection and subsequent combustion may be less noticeable. To decrease the mass of trapped gas, boost pressure may be decreased prior to entry into the deceleration phase and/or during the deceleration phase. To increase or decrease the boost pressure, turbocharger parameters may be adjusted, such as decreasing or increasing an amount of exhaust gas that bypasses the turbine of the turbocharger (e.g., by adjusting a position of a wastegate coupled across the turbine) or other suitable adjustment.

In one example, to increase the robustness of the correction factor determination while minimizing torque disturbances (which may be noticeable to an operator of the vehicle), a first test fuel injection event may be carried out while the closed EGR circuit has a first, smaller mass of trapped gas, for example by decreasing boost pressure during and/or prior to operation in the deceleration phase. The first test fuel injection amount may be relatively small owing to the smaller mass of trapped gas. If the calculated fuel injection amount differs from the commanded/setpoint fuel injection amount for the test injection, a second test may be performed during a subsequent deceleration phase. In the second test, a second test fuel injection event may be carried out while the closed EGR circuit has a second, larger mass of trapped gas, for example by increasing boost pressure during and/or prior to operation in the deceleration phase. The second test fuel injection amount may be relatively large (e.g., larger than the first test fuel injection amount) owing to the larger mass of trapped gas. In this way, the deviation from the commanded/setpoint fuel injection amount may be confirmed and a more accurate correction factor may be calculated. By first performing a smaller fuel injection and only carrying out the larger fuel injection event if the smaller fuel injection event indicates a potential deviation in the fuel injection amount, torque disturbances may be minimized.

Thus, in one example, a method may include adjusting a fuel injection parameter for a fuel injection event to a cylinder of an engine based on a fuel injector correction factor. The fuel injector correction factor may represent a difference between a first consumed oxygen fraction in a closed exhaust gas recirculation (EGR) circuit prior to a test fuel injection event and a second consumed oxygen fraction in the closed EGR circuit after the test fuel injection event. The fuel injector correction factor may be determined responsive to a no-load condition of the engine where the engine is rotating, and adjusting the fuel injection parameter may include adjusting a fuel injection duration of the fuel injection event relative to a setpoint fuel injection duration. To determine the correction factor, the method may include responsive to the no-load condition of the engine while the engine is rotating, closing an exhaust throttle valve and an intake throttle valve and opening an EGR valve to form the closed EGR circuit; determining the first consumed oxygen fraction as a function of an estimated air mass in the closed EGR circuit and a first signal output from an oxygen sensor positioned in the closed EGR circuit; performing the test fuel injection event; after the test fuel injection event, determining the second consumed oxygen fraction as a function of the estimated air mass in the closed EGR circuit and a second signal output from the oxygen sensor; calculating an actual fuel mass of the test fuel injection event from the difference between the first consumed oxygen fraction and the second consumed oxygen fraction; and setting the fuel injector correction factor as a function of the actual fuel mass and a setpoint fuel mass of the test fuel injection event. As used herein, adjusting a fuel injection parameter based on a fuel injector correction factor may include obtaining a setpoint fuel injection parameter, such as injection duration, from a look-up table stored in memory of a control unit, where the duration stored in the look-up table is indexed to one or more of requested engine torque, engine speed, and engine load. The setpoint duration may be corrected by the correction factor. In one example, the setpoint duration may be multiplied by the correction factor to reach the adjusted fuel injection duration. In other examples, the correction factor may be added to the setpoint duration to reach the adjusted fuel injection duration. Other mechanisms of adjusting the setpoint duration by the correction factor are possible, such as applying a gain to the correction factor and then multiplying or adding this amount to the setpoint.

In another example, the setpoint/commanded fuel injection amount may be corrected or adjusted by adjusting the energizing time of the injectors (e.g., the duration) until a difference between a measured and estimated consumed oxygen content in the exhaust is minimized (reaches zero or nearly zero). The estimated consumed oxygen content in the exhaust may be estimated according to a dynamic model that takes into account the intake manifold and induction volume dynamics, the EGR line delay, the injection event, the compressor and turbine delay, filtering, and mixing. To increase accuracy, an additional estimation may be provided according to output from an intake oxygen sensor and the amount of fuel injected, and a least squares calculation may be applied to the two estimations until the difference is minimized.

The method according to the disclosure described above relates to an internal combustion engine, which drives a motor vehicle, for example, and, in particular, is a diesel or spark-ignition engine. The internal combustion engine has a fuel injection system and can comprise one or more cylinders, wherein at least one injection valve is assigned to each cylinder to feed fuel into a combustion chamber of the cylinder. Here, the respectively injected fuel quantity, e.g., fuel mass, is determined by a control unit in accordance with the respective operating conditions or operating parameters, in particular the torque demand on the internal combustion engine and the engine speed, and the injection valve is activated accordingly. For this purpose, appropriate injection parameters of the injection valve are selected by the engine control system; in particular, the fuel mass fed to the combustion chamber depends on the flow rate, e.g., on the fuel mass flowing through the valve per unit time, and the injection duration. The invention relates, in particular, to a direct injection system.

The internal combustion engine may furthermore be fitted with an exhaust gas recirculation system. By the exhaust gas recirculation system, some of the exhaust gases from the internal combustion engine may be fed back into the intake tract from the exhaust tract via an exhaust gas recirculation line, thereby making it possible, in particular, to achieve a reduction in pollutant emissions. The internal combustion engine may have an exhaust turbocharger. The turbocharger has a turbine, which is arranged in the exhaust gas flow and which drives a compressor arranged in the intake tract, which is used to compress the charge air fed to the engine, it being possible for said charge air to be a mixture of fresh air and recirculated exhaust gas. It is thereby possible to achieve an increase in power. The exhaust gas recirculation system can be a high-pressure or low-pressure exhaust gas recirculation system, wherein exhaust gas is removed upstream or downstream of the turbine of the turbocharger and fed into the charge air drawn in downstream or upstream, respectively, of the compressor of the turbocharger.

In a method according to the disclosure, an injection duration of at least one injection valve of the internal combustion engine is modified, e.g., the at least one injection valve is activated by the control unit with an injection duration that is modified relative to an initial state. Here, the modification of the injection duration may be a lengthening or shortening of the injection duration relative to a preset injection duration of the injection valve, for example. Thus, according to the disclosure, the injection valve is activated with injection durations or activation times in each case of different length in a plurality of injections, and different fuel quantities in each case are injected into the cylinder to which the at least one injection valve is assigned.

During the plurality of injections with in each case different injection durations, a respective oxygen fraction, consumed by combustion of the fuel, of the exhaust gas is then measured, and at least one value for the oxygen fraction, consumed by combustion of the fuel, of the exhaust gas is estimated. In particular, measurement of the consumed oxygen fraction is performed by measuring the residual oxygen content of the exhaust gas, e.g. by a lambda probe arranged in the exhaust tract. After a modification of the injection duration, measurement of the oxygen content of the exhaust gas may take place after a waiting time, within which the injection duration of the at least one injection valve remains the same, with the result that the measured oxygen content corresponds to the modified injection duration and to the correspondingly modified injected fuel quantity.

According to the disclosure, a difference between the measured value and the at least one estimated value for the consumed oxygen fraction of the exhaust gas is calculated during the injections with different injection durations, and an optimum injection duration is determined on the basis of the differential values determined in this way. During the continued operation of the internal combustion engine, the at least one injection valve is activated with an adapted injection duration dependent on the optimum injection duration determined.

The fact that the injection duration of the at least one injection valve is varied, that a consumed oxygen fraction of the exhaust gas is measured and additionally estimated for each of the different injection durations and that an optimum injection duration is determined in accordance with the respective difference between the measured and the estimated oxygen fraction makes it possible in each case to supply the internal combustion engine with a fuel quantity in the subsequent injections which corresponds approximately to a setpoint fuel quantity determined from the respectively applicable operating parameters. Thus, for example, when the operating conditions, in particular a torque demand and the speed of the internal combustion engine, are unchanged relative to those which apply in the determination of the optimum injection duration, the optimum injection duration is at least approximately equal to that necessary for injecting the setpoint fuel quantity corresponding to the relevant operating parameters. It is also possible to determine and use an appropriately optimized injection duration for operating conditions that have changed relative to this, said optimum injection duration being modified, for example, in the same ratio relative to the respective setpoint injection duration as the optimum injection duration relative to the setpoint injection duration applicable under the relevant operating conditions. As a result, it is possible, for example, to compensate a deviation in the flow rate of the injection valve from a nominal value by a correspondingly adapted injection duration, wherein a reduced flow rate is compensated by an extended injection duration, while, in the case of an increased flow rate, the injection valve is operated with a shortened injection duration. In this way, improved control and, in particular, more economical operation of the internal combustion engine is made possible.

The variation according to the invention of the injection duration of the at least one injection valve and the determination of the optimum injection duration are preferably carried out during an operating phase of the internal combustion engine with approximately constant operating conditions ("steady-state"). In particular, the method is carried out in an operating phase in which the torque demand on the internal combustion engine and the speed thereof are approximately constant. For this purpose, provision can be made, after determination of the optimum injection duration, to compare the operating conditions that then apply with those that apply at the beginning of the method and, if deviations that exceed a predetermined threshold are detected, not to use the optimum injection duration determined. It is thereby possible to achieve an increased accuracy in the determination of the optimum injection duration.

According to an embodiment of the disclosure, the estimated consumed oxygen fraction is determined from a model which has at least one air mass flow and one setpoint injection duration as input variables. The air mass flow can be determined by an appropriate mass flow sensor in the intake tract, for example. The setpoint injection duration is obtained from the setpoint fuel quantity, which is determined on the basis of the respectively applicable operating parameters of the internal combustion engine, in particular the demanded torque and the engine speed. Such a model can allow estimation of the consumed oxygen fraction in a simple manner, in particular without the need to provide further sensors for this purpose.

The model may be a dynamic model which takes into account the dynamic changes of the intake tract, of the gas volume in the engine itself, and of the exhaust tract. In particular, the dynamic model takes into account time delays due to exhaust gas recirculation, compression by the compressor and flow through the turbine and the dynamic effect of the filling of the cylinders, compression in the cylinders, injection and combustion and gas expulsion from the cylinders. Furthermore, dynamic effects of filtering and gas mixing may be taken into account. It is thereby possible to increase the accuracy of estimation of the consumed oxygen fraction.

Another possibility for estimating the consumed oxygen fraction, which may be used as an alternative or in addition, is to determine the estimated consumed oxygen fraction in the exhaust gas on the basis of the consumed oxygen fraction of the charge air. For this purpose, the oxygen content of the charge air may be measured by a sensor, in particular a lambda probe, arranged in the intake tract. By doing so, estimation of the consumed oxygen fraction is made possible in a simple manner, wherein there is often an appropriate sensor already present in the intake tract for the purpose of controlling exhaust gas recirculation. If, in addition to estimation of the consumed oxygen fraction in the exhaust gas on the basis of the consumed oxygen fraction of the charge air, estimation of the consumed oxygen fraction is also carried out from a model which has an air mass flow and a setpoint injection duration as input variables, redundant and thus more reliable determination of the optimum injection duration can thereby be achieved.

The consumed oxygen fraction estimated on the basis of the oxygen content of the charge air is preferably determined taking into account a setpoint injection duration and the measured pressure and measured temperature of the charge air. The setpoint injection duration is determined on the basis of the operating parameters of the internal combustion engine, in particular torque demand and engine speed. Sensors for measuring the pressure and temperature of the charge air are in general already present in the intake tract for the purpose of controlling the turbocharger. It is thereby possible to increase the accuracy of estimation of the consumed oxygen fraction.

According to an embodiment of the disclosure, the optimum injection duration is determined in such a way that the absolute value of the difference between the measured and the estimated consumed oxygen fraction in the exhaust gas reaches a minimum, at least a relative minimum. Among the different injection durations chosen when modifying the injection duration of the at least one injection valve, the injection duration determined as the optimum injection duration is thus the one at which the absolute value of the difference between the measured and the estimated consumed oxygen fraction in the exhaust gas is minimal; the optimum injection duration can also be determined by interpolation between values close to the minimum. In this case, the estimated consumed oxygen fraction may be determined, for example, from a model dependent on the air mass flow and the setpoint injection duration or on the basis of the consumed oxygen fraction of the charge air. Sufficiently accurate determination of the optimum injection duration, which allows adaptation of the injection duration during normal operation of the internal combustion engine, e.g., outside the method described for determining the optimum injection duration, in order to compensate a change in the flow rate of the injection valve, for example, is thereby made possible in a simple manner.

According to an embodiment of the disclosure, the optimum injection duration is determined by determining a measured value for the consumed oxygen fraction in the exhaust gas when there is a change in the injection duration of the at least one injection valve, the difference between the measured value and a first estimated value for the consumed oxygen fraction in the exhaust gas is calculated, the difference between the measured value and a second estimated value for the consumed oxygen fraction in the exhaust gas is calculated, the sum of the squares of the differences is formed, and the optimum injection duration is determined to be the one at which the sum of the squares assumes a minimum, at least a relative minimum. Here, the first estimated value for the consumed oxygen fraction is determined, in particular, from a model dependent on the air mass flow and the setpoint injection duration, and the second estimated value is determined on the basis of the consumed oxygen fraction of the charge air. The optimum injection duration is the one among the injection durations chosen when modifying the injection duration at which said sum of the squares is minimal; the optimum injection duration may also be determined by interpolation between two adjacent values. In this way, particularly accurate determination of the optimum injection duration is possible, allowing improved control of injection during the further operation of the internal combustion engine.

The internal combustion engine may have a plurality of injection valves, which are, in particular, each assigned to respective one of a plurality of combustion chambers or cylinders. In this case, an optimum injection duration for each injection valve is determined, and the relevant injection valve is activated with an adapted injection duration dependent on the respective optimum injection duration. In this case, provision can be made for the modification of the injection duration and the determination of the optimum injection duration to be carried out separately for each injection valve, wherein the injection duration remains unchanged on the remaining injection valves. It is thereby possible to determine the respective optimum injection durations for all the injection valves of the internal combustion engine in a particularly accurate manner, and all the injection valves can be activated with an appropriately adapted injection duration during the further operation of the internal combustion engine. Improved control of the internal combustion engine and, in particular, more economical operation can thereby be achieved. Moreover, it is possible to avoid the production of unequal torques of the individual cylinders and hence the occurrence of torsional vibrations.

A device according to the invention for controlling an internal combustion engine, which has a fuel injection system and an exhaust gas recirculation system, comprises a control unit, which stores instructions in memory and executes the instructions for carrying out the above-described method for controlling the internal combustion engine. For this purpose, the control unit includes instructions to activate at least one injection valve of the internal combustion engine in order to vary the injection duration. The control unit includes instructions to determine a measured value for the consumed oxygen fraction in the exhaust gas, in particular by detecting the sensor signal of an oxygen sensor arranged in the exhaust tract, and to determine at least one estimated value for the consumed oxygen fraction in the exhaust gas, for which purpose the control unit may detect the signals of further sensors. The control unit includes instructions to calculate a difference between the measured oxygen fraction and the estimated consumed oxygen fraction, to determine an optimum injection duration on the basis of this difference, and to activate the at least one injection valve with an adapted injection duration dependent on the optimum injection duration. The control device may comprise a processor for calculating the measured and the estimated oxygen fraction in the exhaust gas, for calculating the difference between the two values and for determining the optimum injection duration, in particular as a minimum of the difference, and for determining the adapted injection duration. Furthermore, the control unit may comprise storage (e.g., memory) for storing measured values and estimated values of the oxygen content of the exhaust gas and of differences between said values and the sum of the squares of the differences and the associated injection durations. The control unit may be part of an electronic engine control system of the internal combustion engine.

The device for controlling the internal combustion engine can furthermore comprise a sensor, e.g. a lambda probe, for measuring the oxygen content in the exhaust tract and, if appropriate, further sensors in the exhaust and/or intake tract of the internal combustion engine.

Figure 5:
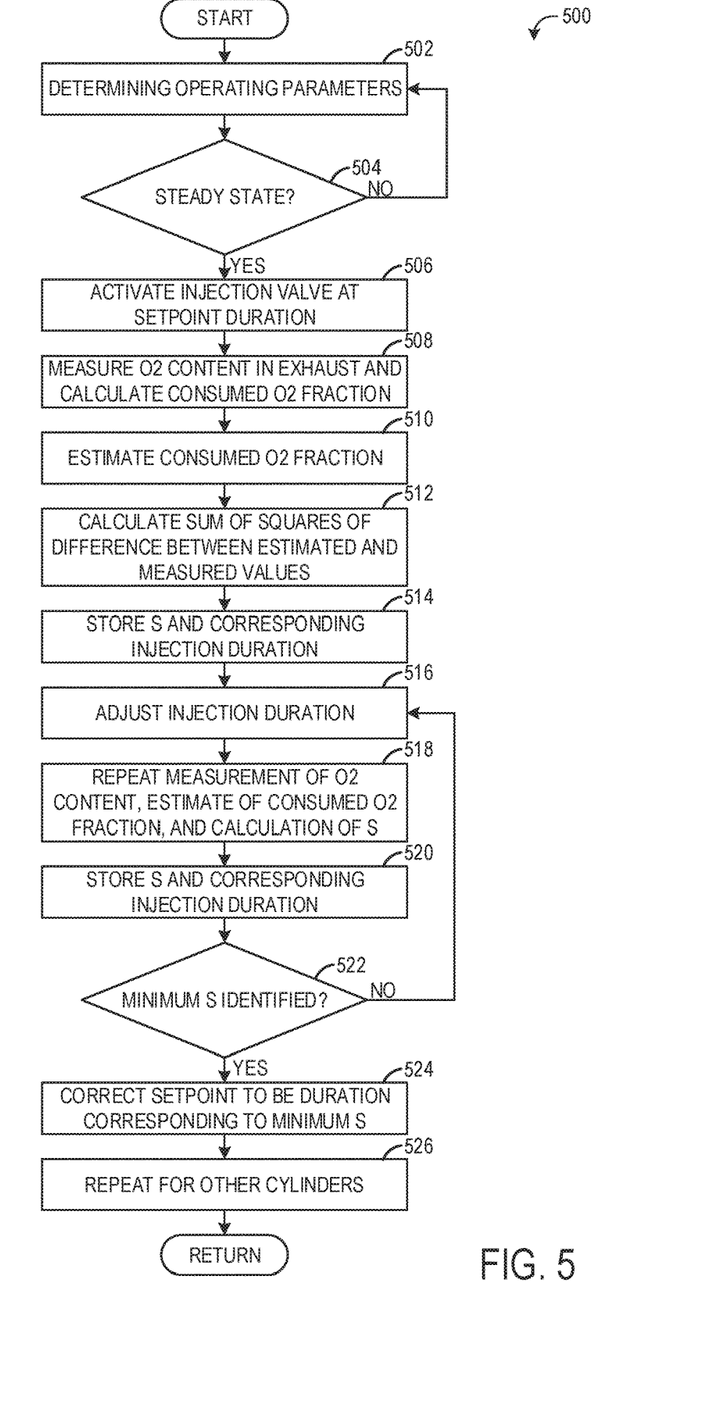
FIG. 5 shows a flow diagram for a further embodiment of a method according to the disclosure.

An illustrative embodiment of a method 500 according to the disclosure is shown in simplified form in a flow diagram in FIG. 5. Method 500 may be carried out by control unit 112 according to instructions stored in memory of the control unit, in combination with one or more sensors (e.g., the charge air sensors 17 of FIGS. 1-3) and one or more actuators (e.g., the engine fuel injectors). At 502, method 500 includes determining operating parameters. The determined operating parameters may include vehicle speed, engine speed, engine load, accelerator and/or brake pedal position, etc. At 504, method 500 determines if the engine is currently operating under steady state conditions. Steady state conditions may include engine speed and/or load changing by less than a threshold amount, such as changing by less than 5% over a given duration (e.g., five or ten seconds). If the engine is not operating with steady state conditions (e.g., if the engine is operating under a transient condition such as accelerating or decelerating), method 500 returns to 502 to continue to assess operating parameters.

If it is established on the basis of the current operating parameters that the method is to be carried out, that is to say, in particular, if the internal combustion engine is in an operating phase with approximately constant operating conditions, method 500 proceeds to 506 to activate an injection valve, for which an optimum injection duration is to be determined. The injection valve (also referred to herein as an injector) may be activated with an injection duration $T_0$, which corresponds to a setpoint value of the injection duration determined from the current operating parameters. In other words, the injector is activated for a duration that is predicted to deliver the amount of fuel commanded by the control unit for the current engine conditions (e.g., engine load, engine speed). At 508, an oxygen content $O_{2,exh}$ (in percent) in the exhaust gas is measured, for example by the lambda probe 18 in the exhaust tract (see FIGS. 1 to 3). An average over a time interval of a few seconds, during which the injection duration of the injection valve is not modified, may in each case be formed to increase accuracy in this process, as also in the case of the other measured values. From the oxygen content $O_{2,exh}$, the consumed oxygen fraction in the exhaust gas is measured:

$$f_{exh,meas}=1-O_{2,exh}/23.3\%/kg$$

At 510, one or more estimated values of the consumed oxygen fraction in the exhaust are determined. In one example, two estimated values for the consumed oxygen fraction in the exhaust gas are determined. The first estimated value $f_{exh,est1}$ is determined by a dynamic model, which simulates the dynamic properties of the intake tract, of the injection and of the gas delivery in the internal combustion engine, and of the exhaust tract and is stored in the control unit. In the simplest case, in particular with constant operating parameters of the internal combustion engine, the first estimated value may be calculated from the air mass flow $m_{af}$ measured by an appropriate sensor and from the setpoint value for the fuel mass to be injected $W_{fuel}$, which is determined from the operating parameters, in particular from the torque demand and the speed of the internal combustion engine:

$$f_{exh,est1}=1-[(\lambda-1)\varphi_{stoich}]/(\lambda\varphi_{stoich}+1)$$

where $$\lambda=m_{af}/(W_{fuel}\varphi_{stoich}),$$

and $\varphi_{stoich}$ is the stoichiometric air/fuel ratio.

The second estimated value $f_{exh,est2}$ is determined by the consumed oxygen fraction $O_{2,man}$ (in percent) in the charge air, which may be measured by a lambda probe, arranged in the intake pipe, of the charge air sensors 17 (see FIGS. 1 to 3):

$$f_{exh,est2}=[f_{man}+(1+\lambda_{ref})W_{fuel}/WAP]/(1+W_{fuel}/WAP)$$

where $$f_{man}=1-O_{2,man}/23.3\%/kg$$

and $\lambda_{ref}$ is a reference lambda value determined for the specific type. The total mass flow WAP in the intake pipe may be determined by the relationship between speed and density:

$$WAP=\eta pVN/RT,$$

where $\eta$ is the volumetric efficiency of the cylinders, V is the total cylinder volume that can be filled with gas, R is the specific gas constant, and N is the speed of the internal combustion engine. The pressure p and temperature T of the charge air are measured by the charge air sensors 17 in the intake pipe.

The sum of the squares of the differences between the measured values and the two estimated values for the consumed oxygen fraction in the exhaust gas is then calculated, at 512 of method 500, according to:

$$S=(f_{exh,meas}-f_{exh,est1})^2+(f_{exh,meas}-f_{exh,est2})^2$$

At 514, the value of S determined is stored, together with the corresponding injection duration $T_0$, which has been determined from the applicable operating parameters at that time, in order to inject the setpoint fuel mass $W_{fuel}$ suitable for producing the torque demanded at this time.

At 516, the injection duration of the injection valve is adjusted, for example increased by a few percent, giving a corresponding increase in the injected fuel mass. If appropriate after a waiting time, at 518 the measured value $f_{exh,meas}$, the two estimated values $f_{exh,est1}$, $f_{exh,est2}$ and the sum S are determined as described above, and an additional S and corresponding injection duration are stored.

At 522, method 500 determines if a minimum value for S has been identified. A check may be made to ascertain whether determination of the optimum injection duration $T_{opt}$ has been successful, e.g., whether a sufficient number of different values of the injection duration have been chosen, whether it was possible to determine a minimum of the sum S, and whether the operating parameters of the internal combustion engine have changed to such an extent while the method is being carried out, for example, that it was not possible to make an informative determination of $T_{opt}$. In the latter case, the method is carried out once again for the relevant cylinder when constant operating conditions are once again present.

If a minimum value for S has not been identified, for example if less than a threshold number of S values have been obtained, method 500 loops back to 516 and adjusts the injection duration again and repeats the determination of S. In a similar way, this can be performed for further modified injection durations, wherein the respective values of the sum S are stored.

If the minimum S has been identified, method 500 proceeds to 524 to correct the setpoint duration for the given injected fuel mass to the duration that corresponds to the minimum value of S. Among all the stored values of the sum S, the minimum is sought, and the value of the injection duration $T_{opt}$ at which the minimum has been reached is taken to be the optimum injection duration and is stored. Here, the optimum injection duration $T_{opt}$ may also be determined by interpolation from two adjacent values.

The optimum injection duration $T_{opt}$ may differ from the setpoint injection duration $T_0$, in that the flow rate of the injection valve is reduced compared with a nominal value due to deposits in the injection nozzle, for example. From this, the actual flow rate of the injection valve can be determined and, during the further operation of the internal combustion engine, an appropriate modification of the injection duration may be used to ensure that a setpoint fuel mass which corresponds to the respective operating conditions is injected. Thus, for example, the quotient $T_{opt}/T_0$ can be used as a correction factor in order to adapt the setpoint injection duration of the injection valve determined on the basis of the respective operating conditions during the further operation of the internal combustion engine and thereby to compensate a change in the flow rate, for instance.

In a corresponding manner, the method is then repeated for the other cylinders, as indicated at 526. The method may be carried out for the remaining injection valves or cylinders and corresponding corrections are determined in succession for all the injection valves or cylinders of the internal combustion engine and taken into account during injection in normal operation, e.g., during operation outside the performance of the method for determining the correction. It is also possible for the corrections for all the injection valves or cylinders to be determined first and only then to be used by the control unit. Method 500 then returns.

The method described may be repeated regularly, e.g. the method may be carried out again and new corrections determined after a time in operation of a motor vehicle fitted with the internal combustion engine within which a change in the flow rate of an injection valve can occur. For example, the method may be carried out again for a predetermined time has elapsed, after a predetermined number of engine cycles or miles driven has elapsed, or other suitable condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a motor-vehicle internal combustion engine fitted with a fuel injection system and an exhaust gas recirculation system, comprising:
   in a deceleration phase, forming a closed exhaust gas recirculation circuit;
   determining a mass ($m_{circ}$) of an air quantity enclosed in the closed exhaust gas recirculation circuit;
   detecting a first oxygen content of the air quantity;
   carrying out a test injection with an injection valve;
   detecting a second oxygen content of the air quantity; and
   determining a fuel mass ($m_{fuel}$) injected in the test injection from the mass ($m_{circ}$) of the air quantity and the first and the second oxygen contents.

2. The method as claimed in claim 1, wherein forming the closed exhaust gas recirculation circuit comprises activating an exhaust valve, an intake throttle valve, and an exhaust gas recirculation valve, or activating the exhaust valve and a three-way valve in an intake tract.

3. The method as claimed in claim 1, wherein the mass ($m_{circ}$) of the air quantity is determined by at least one pressure sensor and at least one temperature sensor.

4. The method as claimed in claim 1, further comprising observing a first waiting time $t_1$ after the formation of the closed exhaust gas recirculation circuit and before the detection of the first oxygen content, and/or observing a second waiting time $t_2$ after the test injection is carried out and before the second oxygen content is detected.

5. The method as claimed in claim 1, wherein the first and second oxygen contents are measured by at least one oxygen sensor in the exhaust tract and/or at least one oxygen sensor in the intake tract.

6. The method as claimed in claim 5, wherein a respective fuel mass ($m_{fuel,exh}$, $m_{fuel,man}$) injected in the test injection is calculated from the first oxygen content and the second oxygen content each measured by the at least one oxygen sensor in the exhaust tract, and further from a third oxygen content and a fourth oxygen content each measured by the at least one oxygen sensor in the intake tract, and an average is formed in order to determine the fuel mass ($m_{fuel}$) injected in the test injection.

7. The method as claimed in claim 1, wherein the internal combustion engine has a plurality of injection valves and wherein the fuel mass ($m_{fuel}$) injected in a respective test injection is determined for each injection valve.

8. The method as claimed in claim 1, wherein an exhaust gas aftertreatment system of the internal combustion engine is controlled on a basis of the fuel mass ($m_{fuel}$) determined.

9. The method as claimed in claim 1, wherein a correction of at least one injection parameter is determined from at least one injection parameter of the test injection and from the fuel mass ($m_{fuel}$) determined in order to adapt the injected fuel mass ($m_{fuel}$) to a setpoint fuel mass ($m_{test,soll}$) and wherein the injection valve is activated in at least one further injection in accordance with the correction determined.

10. The method as claimed in claim 9, wherein at least one injection parameter is an injection duration ($T_{inj}$).

11. A method for controlling an internal combustion engine fitted with a fuel injection system and an exhaust gas recirculation system, comprising:
    modifying an injection duration of at least one injection valve;
    measuring a consumed oxygen fraction of exhaust gas, wherein the measuring occurs after a first waiting time $t_1$ after the formation of a closed exhaust gas recirculation circuit, wherein substantially an entire exhaust gas flow from the internal combustion engine is passed through the exhaust gas recirculation system into an intake tract of the internal combustion engine, and substantially no fresh air is supplied to the intake tract;
    estimating a consumed oxygen fraction of the exhaust gas;
    determining an optimum injection duration in accordance with a difference between the measured and estimated consumed oxygen fractions; and
    activating at least one injection valve with an adapted injection duration dependent on the optimum injection duration.

12. The method as claimed in claim 11, wherein the method is carried out during an operating phase of the internal combustion engine with approximately constant operating conditions.

13. The method as claimed in claim 11, wherein the estimated consumed oxygen fraction is determined from a model dependent on an air mass flow and a setpoint injection duration.

14. The method as claimed in claim 13, wherein the model is a dynamic model.

15. The method as claimed in claim 11, wherein the estimated consumed oxygen fraction is determined on a basis of a consumed oxygen fraction of charge air.

16. The method as claimed in claim 15, wherein the estimated consumed oxygen fraction is determined taking into account a setpoint injection duration and a measured pressure and a measured temperature of the charge air.

17. The method as claimed in claim 11, wherein the optimum injection duration is determined in such a way that an absolute value of the difference between the measured and estimated consumed oxygen fractions in the exhaust gas reaches a minimum.

18. A method, comprising:
    adjusting a fuel injection parameter for a fuel injection event to a cylinder of an engine based on a fuel injector correction factor, the fuel injector correction factor representing a difference between a first consumed oxygen fraction in a closed exhaust gas recirculation (EGR) circuit prior to a test fuel injection event and a second consumed oxygen fraction in the closed EGR circuit after the test fuel injection event, wherein, upon formation of the closed EGR circuit, substantially an entire exhaust gas flow from the engine is passed through an EGR system into an intake tract of the engine, and substantially no fresh air is supplied to the intake tract.

19. The method of claim 18, wherein the fuel injector correction factor is determined responsive to a no-load condition of the engine where the engine is rotating, and wherein adjusting the fuel injection parameter comprises adjusting a fuel injection duration of the fuel injection event relative to a setpoint fuel injection duration.

20. The method of claim 19, further comprising:
    responsive to the no-load condition of the engine while the engine is rotating, closing an exhaust throttle valve and an intake throttle valve and opening an EGR valve to form the closed EGR circuit;
    determining the first consumed oxygen fraction as a function of an estimated air mass in the closed EGR circuit and a first signal output from an oxygen sensor positioned in the closed EGR circuit;
    performing the test fuel injection event;
    after the test fuel injection event, determining the second consumed oxygen fraction as a function of the estimated air mass in the closed EGR circuit and a second signal output from the oxygen sensor;
    calculating an actual fuel mass of the test fuel injection event from a difference between the first consumed oxygen fraction and the second consumed oxygen fraction; and
    setting the fuel injector correction factor as a function of the actual fuel mass and a setpoint fuel mass of the test fuel injection event.

* * * * *